US012775841B2

(12) United States Patent
Natsumeda

(10) Patent No.: US 12,775,841 B2
(45) Date of Patent: Oct. 27, 2026

(54) METHOD OF LEARNING NEURAL NETWORK, RECORDING MEDIUM, AND REMAINING LIFE PREDICTION SYSTEM

(71) Applicant: NEC Corporation, Tokyo (JP)

(72) Inventor: Masanao Natsumeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 653 days.

(21) Appl. No.: 18/212,486

(22) Filed: Jun. 21, 2023

(65) Prior Publication Data

US 2023/0419109 A1 Dec. 28, 2023

(30) Foreign Application Priority Data

Jun. 27, 2022 (JP) ................................ 2022-102925

(51) Int. Cl.
*G06F 7/00* (2006.01)
*G06N 3/08* (2023.01)

(52) U.S. Cl.
CPC ..................................... *G06N 3/08* (2013.01)

(58) Field of Classification Search
CPC ........................................................ G06N 3/08
USPC .................................... 707/600–899; 706/25
See application file for complete search history.

(56) References Cited

U.S. PATENT DOCUMENTS

2017/0161622 A1 6/2017 Kung et al.
2018/0174658 A1 6/2018 Kikuchi
2020/0134380 A1 4/2020 Xu et al.
2020/0380388 A1 12/2020 Wang et al.
2021/0166121 A1 6/2021 Tsutsui
2022/0414556 A1* 12/2022 Seabloom .............. G06Q 10/04

FOREIGN PATENT DOCUMENTS

JP 6386523 B2 9/2018
JP 2020-198081 A 12/2020
JP 2021-056153 A 4/2021
JP 2021-086572 A 6/2021

OTHER PUBLICATIONS

JP Office Action for JP Application No. 2022-102925, mailed on Mar. 17, 2026 with English Translation.

* cited by examiner

*Primary Examiner* — Isaac M Woo

(57) ABSTRACT

Provided is a method of learning a neural network that predicts a remaining life of a target device that is a maintenance target. The neural network includes: (i) a first model for predicting a remaining life at an arbitrary time of maintenance cycle data, as a value based on an arbitrary reference value; and (ii) a second model for predicting a remaining life at a final time of the maintenance cycle data, as a value based on the reference value. The method comprises updating a weight parameter of the first model so as to predict a remaining life based on an end of the maintenance cycle data, by using an output of the first model and an output of the second model that are obtained from learning data including a plurality of maintenance cycle data.

10 Claims, 13 Drawing Sheets

METHOD OF LEARNING NEURAL NETWORK, RECORDING MEDIUM, AND REMAINING LIFE PREDICTION SYSTEM

INCORPORATION BY REFERENCE

This application is based upon and claims the benefit of priority from Japanese Patent Application No. 2022-102925, filed on Jun. 27, 2022, the disclosure of which is incorporated herein in its entirety by reference.

TECHNICAL FIELD

Example embodiments of the present disclosure relate to a method of learning a neural network, a recording medium, and a remaining life prediction system.

BACKGROUND ART

In order to perform maintenance of various devices, a method of estimating a remaining life of a device (i.e., a period until a failure occurs) is known. For example, Patent Literature 1 discloses that the remaining life of an NAND flash memory provided in a numerical control apparatus of a machine tool is predicted by a machine learning model. Patent Literature 2 discloses that the remaining life of a monitoring target system is predicted by a function deep network. Patent Literature 3 discloses that the remaining life is predicted by switching two machine learning models (artificial intelligence units).

PRIOR ART DOCUMENTS

Patent Literature

[Patent Literature 1] Japanese Patent No. 6386523;
[Patent Literature 2] JP2020-198081A; and
[Patent Literature 3] JP2021-056153A

SUMMARY

This disclosure aims to improve the related techniques/technologies described above.

A method of learning a neural network according to an example aspect of this disclosure is a method of learning a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method includes updating a weight parameter of the first model so as to predict a remaining life based on an end of the maintenance cycle data, by using an output of the first model and an output of the second model that are obtained from learning data including a plurality of maintenance cycle data.

A recording medium according to an example aspect of this disclosure is a non-transitory recording medium on which a computer program that allows a computer to execute a method of learning a neural network that predicts a remaining life of a target device that is a maintenance target is recorded, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method includes updating a weight parameter of the first model so as to predict a remaining life based on an end of the maintenance cycle data, by using an output of the first model and an output of the second model that are obtained from learning data including a plurality of maintenance cycle data.

A remaining life prediction system according to an example aspect of this disclosure is a remaining life prediction system including a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the first model is updated by updating a weight parameter of the first model so as to predict a remaining life based on an end of the maintenance cycle data, by using an output of the first model and an output of the second model that are obtained from learning data including a plurality of maintenance cycle data.

EXAMPLE EMBODIMENTS

Hereinafter, a method of learning a neural network, a recording medium, and a remaining life prediction system according to example embodiments will be described with reference to the drawings. The following describes an example in which the method of learning the neural network is performed in the remaining life prediction system.

First Example Embodiment

A remaining life prediction system according to a first example embodiment will be described with reference to FIG. 1 to FIG. 7.

(Hardware Configuration)

Figure 1:
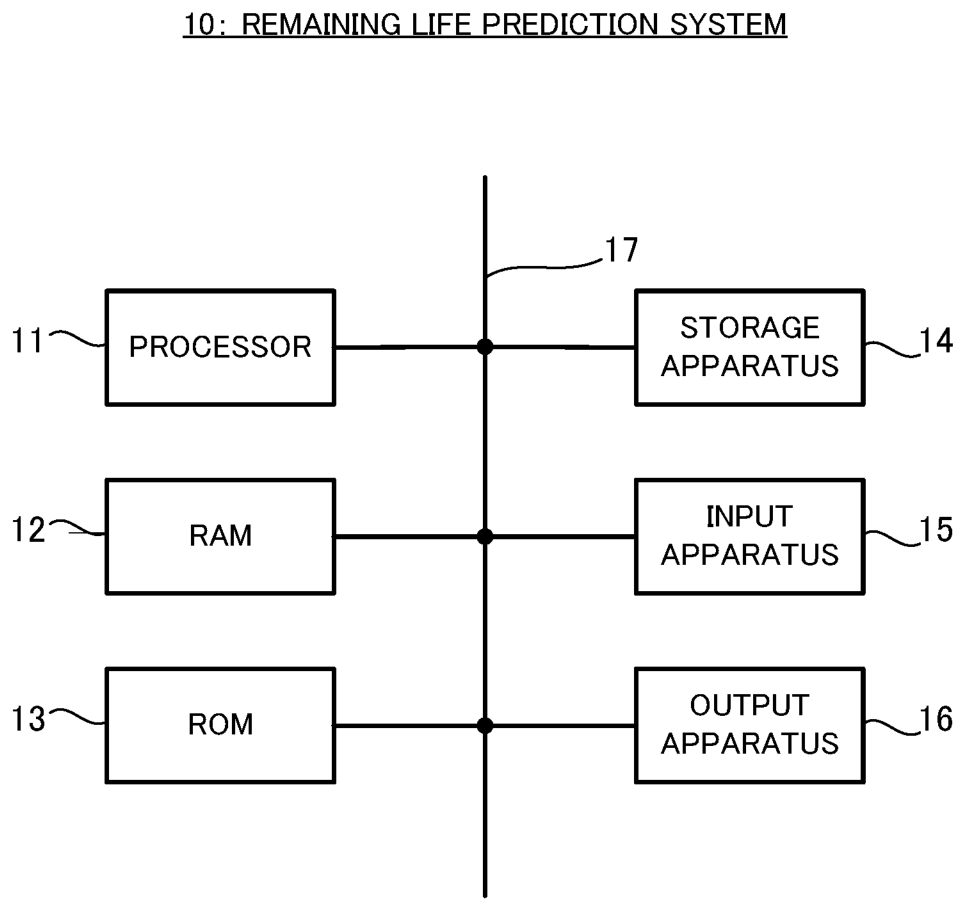
FIG. 1 is a block diagram illustrating a hardware configuration of a remaining life prediction system according to a first example embodiment.

First, with reference to FIG. 1, a hardware configuration of the remaining life prediction system according to the first example embodiment will be described. FIG. 1 is a block diagram illustrating the hardware configuration of the remaining life prediction system according to the first example embodiment.

As illustrated in FIG. 1, a remaining life prediction system 10 according to the first example embodiment includes a processor 11, a RAM (Random Access Memory) 12, a ROM (Read Only Memory) 13, and a storage apparatus 14. The remaining life prediction system 10 may further include an input apparatus 15 and an output apparatus 16. The processor 11, the RAM 12, the ROM 13, the storage apparatus 14, the input apparatus 15 and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium by using a not-illustrated recording medium reading apparatus. The processor 11 may obtain (i.e., may read) a computer program from a not-illustrated apparatus disposed outside the remaining life estimation system 10, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for predicting a remaining life of a target device and a functional block for learning a neural network are realized or implemented in the processor 11. That is, the processor 11 may function as a controller for performing each control in the remaining life prediction system 10 according to the present example embodiment.

The processor 11 may be configured as a CPU (Central Processing Unit), a GPU (Graphics Processing Unit), a FPGA (field-programmable gate array), a DSP (Demand-Side Platform) or an ASIC (Application Specific Integrated Circuit), for example. The processor 11 may include one of them, or may use a plurality of them in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic Random Access Memory) or a SRAM (Static Random Access Memory. Another type of volatile memory may also be used in place of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory. Another type of non-volatile memory may also be used in place of ROM 13.

The storage apparatus 14 stores the data that is stored for a long term by the remaining life prediction system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the remaining life prediction system 10. The input apparatus 15 may include, for example, at least one of a keyboard, a mouse, and a touch panel. The input apparatus 15 may be configured as a portable terminal, such as a smartphone and a tablet. The input apparatus 15 may be an apparatus that allows an audio input including a microphone, for example.

The output apparatus 16 is an apparatus that outputs information about the remaining life prediction system 10 to the outside. For example, the output apparatus 16 may be a display apparatus (e.g., a display) that is configured to display the information about the remaining life prediction system 10. Furthermore, the output apparatus 16 may be a speaker that audio-outputs the information about the remaining life predicting system 10. The output apparatus 16 may be configured as a portable terminal, such as a smartphone or a tablet. Furthermore, the output apparatus 16 may be an apparatus that outputs the information in a format other than an image.

FIG. 1 exemplifies the remaining life predicting system 10 including a plurality of apparatuses, but all or a part of the functions may be realized by a single apparatus. In that case, the remaining life prediction system may include only the processor 11, the RAM 12, and the ROM 13, and the other components (i.e., the storage apparatus 14, the input apparatus 15, and the output apparatus 16) may be provided for an external apparatus connected to the remaining life prediction system 10. In addition, the remaining life prediction system may be configured such that a partial arithmetic function is realized or implemented by an external apparatus (e.g., an external server or a cloud, etc.).

(Functional Configuration)

Figure 2:
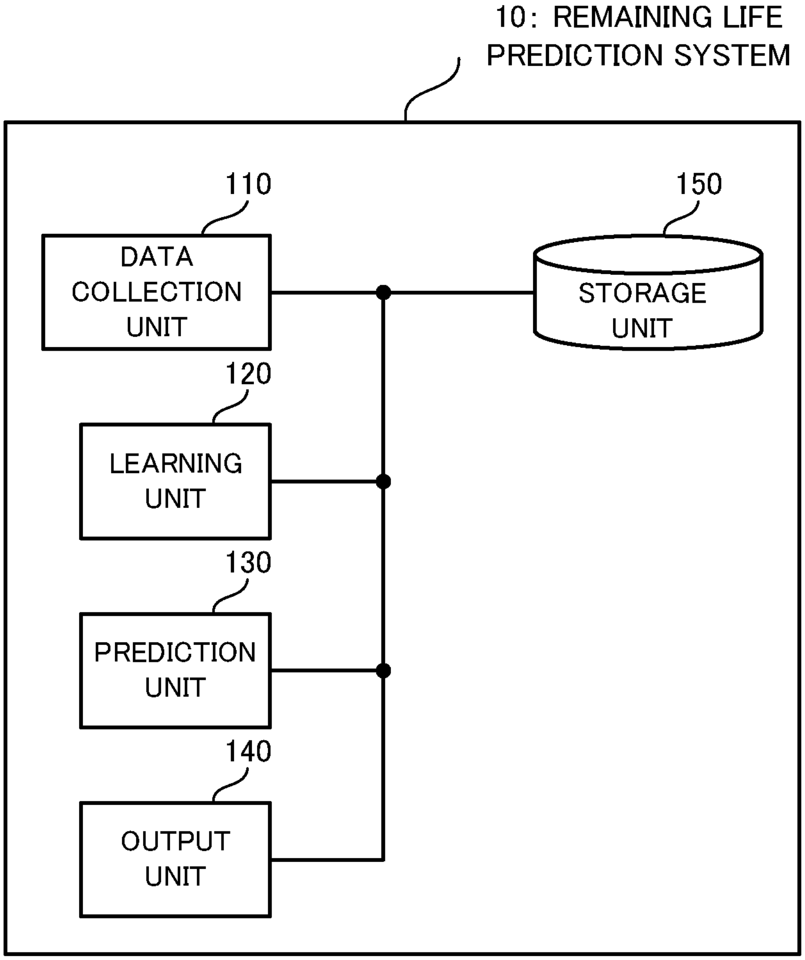
FIG. 2 is a block diagram illustrating a functional configuration of the remaining life prediction system according to the first example embodiment.

Next, with reference to FIG. 2, a functional configuration of the remaining life prediction system 10 according to the first example embodiment will be described. FIG. 2 is a block diagram illustrating the functional configuration of the remaining life prediction system according to the first example embodiment.

As illustrated in FIG. 2, the remaining life prediction system 10 according to the first example embodiment includes, as components for realizing the functions thereof, a data collection unit 110, a learning unit 120, a prediction unit 130, an output unit 140, and a storage unit 150. Each of the data collection unit 110, the learning unit 120, the prediction unit 130, and the output unit 140 may be a processing block that is realized or implemented by the processor 11 (see FIG. 1), for example. Furthermore, the storage unit 150 may be realized or implemented by the storage apparatus 14 (see FIG. 1), for example.

The data collection unit 110 is configured to collect maintenance cycle data of the target device that is a maintenance target. The maintenance cycle data are time series operation data from immediately after the maintenance of the target device to immediately before a next maintenance. The target device is not particularly limited as long as it is a device for performing the maintenance, but an example thereof includes a hard disk, an NAND flash memory, and a rotating device (e.g., a pump, a fan, etc.). In the case of the hard disk, the maintenance cycle data may include Write Count, Average Write Response Time, Max Write Response Time, Write Transfer Rate, Read Count, Average Read Response Time, Max Read Time, Read Transfer Rate, Busy Ratio, Busy Time, or the like. In the case of the NAND flash memory, the maintenance cycle data may include a rewrite number, a rewrite interval, a read number, temperature in an use environment, an error rate, information about a manufacturing maker, and information about a manufacturing lot, as well as information about an error correction coding (ECC) performance, information about a manufacturing maker, information about a manufacturing lot of a memory controller that performs an ECC process on the NAND flash memory. In the case of the rotating device, the maintenance cycle data may include an output value of a strain gage, torque of a motor, current, an ultrasonic wave (AE sensor), an acceleration sensor, or the like.

The learning unit 120 is configured to learn a model for predicting the remaining life (that is, a period until a failure occurs) of the target device, by using the maintenance cycle data collected by the data collection unit 110 as learning data. The remaining life prediction system 10 according to this example embodiment includes a first model and a second model as the model for predicting the remaining life, but the learning unit 120 may be configured to learn at least the first model. The learning unit 120, however, may be configured to learn both the first model and the second model. The learning of the second model will be described in another example embodiment described later.

The prediction unit 130 is configured to predict the remaining life of the target device by using the model learned by the learning unit 120. Specifically, the prediction unit 130 is configured to input the maintenance cycle data collected by the data collection unit 110 to the model that is already learned as data for predicting the remaining life, thereby to predict the remaining life of the target device corresponding to the maintenance cycle data. The prediction operation by the prediction unit 130 will be described in detail later.

The output unit 140 is configured to output various information in the remaining life prediction system 10. For example, the output unit 140 may be configured to output information about the remaining life of the target device predicted by the prediction unit 130. In this case, the information to be outputted may indicate a value of the remaining life, or may be an alarm corresponding to the remaining life (e.g., information for promoting the maintenance) or the like. The output unit 140 may be configured to output various information through the output apparatus 16. For example, the output unit 140 may be configured to output various information through a monitor, a speaker, or the like.

The storage unit 150 is configured to store various information handled by the remaining life prediction system 10. The storage unit 150 may be configured to store the model learned by the learning unit 120, for example. The storage unit 150 may be configured to store the maintenance cycle data collected by the data collection unit 110.

(Learning Operation)

Figure 3:
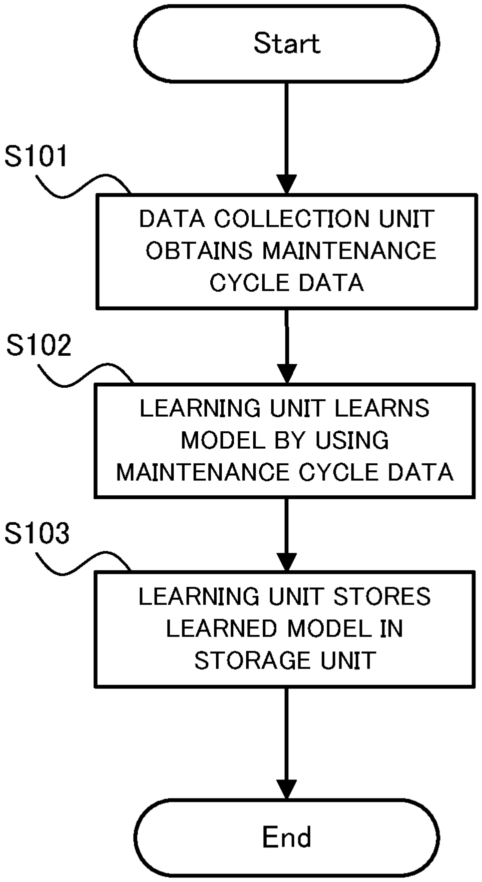
FIG. 3 is a flowchart illustrating a flow of a learning operation of the remaining life prediction system according to the first example embodiment.

Next, a learning operation (i.e., an operation when the model for predicting the remaining life is learned) by the remaining life prediction system 10 according to the first example embodiment will be described with reference to FIG. 3. FIG. 3 is a flowchart illustrating a flow of the learning operation of the remaining life prediction system according to the first example embodiment.

As illustrated in FIG. 3, when the learning operation of the remaining life prediction system 10 according to the first example embodiment is started, first, the data collection unit 110 obtains the maintenance cycle data (step S101). At this time, the data collection unit 110 may newly collect the maintenance cycle data from the target device, or may obtain the maintenance cycle data collected in the past from the storage unit 150. The maintenance cycle data obtained by the data collection unit 110 are outputted to the learning unit 120.

Subsequently, the learning unit 120 learns the model for predicting the remaining life of the target device by using the maintenance cycle data as the learning data (step S102). The operation of learning the model by the learning unit 120 will be described in detail later. When the learning is ended, the learning unit 120 stores the learned model in the storage unit 150 (step S103).

(Prediction Operation)

Figure 4:
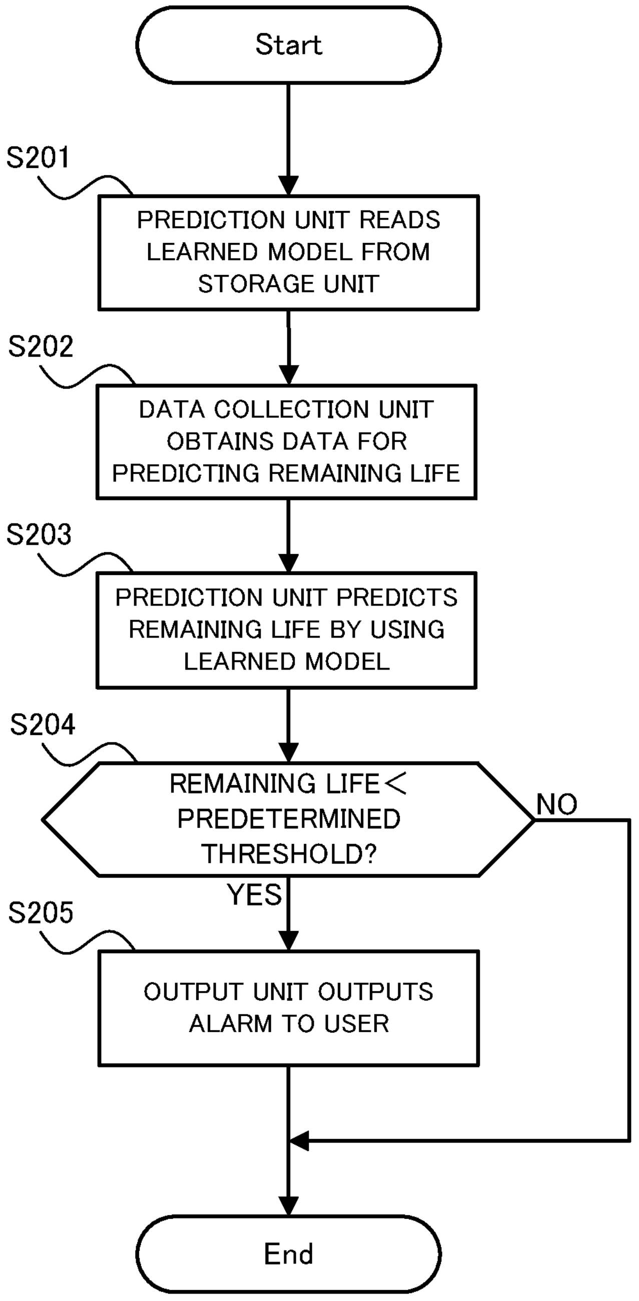
FIG. 4 is a flowchart illustrating a flow of a prediction operation of the remaining life prediction system according to the first example embodiment.

Next, with reference to FIG. 4, a prediction operation (i.e., an operation when the remaining life is predicted by using the learned model) by the remaining life prediction system 10 according to the first example embodiment will be described. FIG. 4 is a flowchart illustrating a flow of the prediction operation of the remaining life prediction system according to the first example embodiment.

As illustrated in FIG. 4, when the prediction operation of the remaining life prediction system 10 according to the first example embodiment is started, first, the prediction unit 130 reads the learned model from the storage unit 150 (step S201). The model read here may be only the first model.

Subsequently, the data collection unit 110 obtains the maintenance cycle data for predicting the remaining life (step S202). At this time, the data collection unit 110 may newly collect the maintenance cycle data from the target device, or may obtain the maintenance cycle data collected in the past from the storage unit 150. The maintenance cycle data obtained by the data collection unit 110 are outputted to the prediction unit 130.

Next, the prediction unit 130 predicts the remaining life of the target device by using the learned model (step S203). Then, the prediction unit 130 determines whether or not the predicted remaining life is less than a predetermined threshold (step S204). The "predetermined threshold" here is a threshold for determining whether or not to perform the maintenance of the target device, and an arbitrary value may be set in advance.

When the predicted remaining life is less than the predetermined threshold (the step S204: YES), the output unit 140 outputs an alarm to the user (step S205). The alarm may include information that promotes a maintenance work, for example. On the other hand, when the predicted remaining life is not less than the predetermined threshold (the step S204: NO), the step S205 may be omitted. Information indicating about when to perform a next maintenance work, however, may be outputted on the basis of the predicted remaining life.

(Learning Data and Model)

Figure 5:
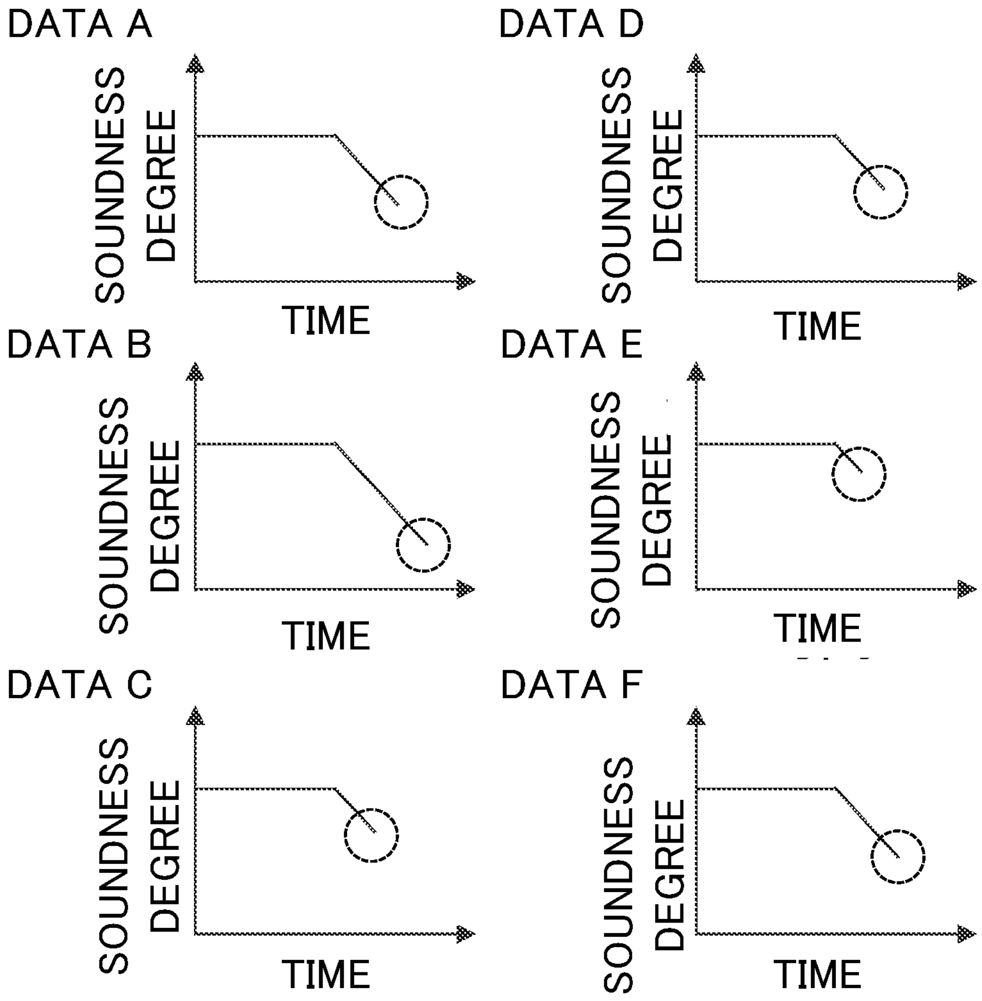
FIG. 5 is a conceptual diagram illustrating a time change in a soundness degree of a device that is a target in each maintenance cycle.
Figure 6:
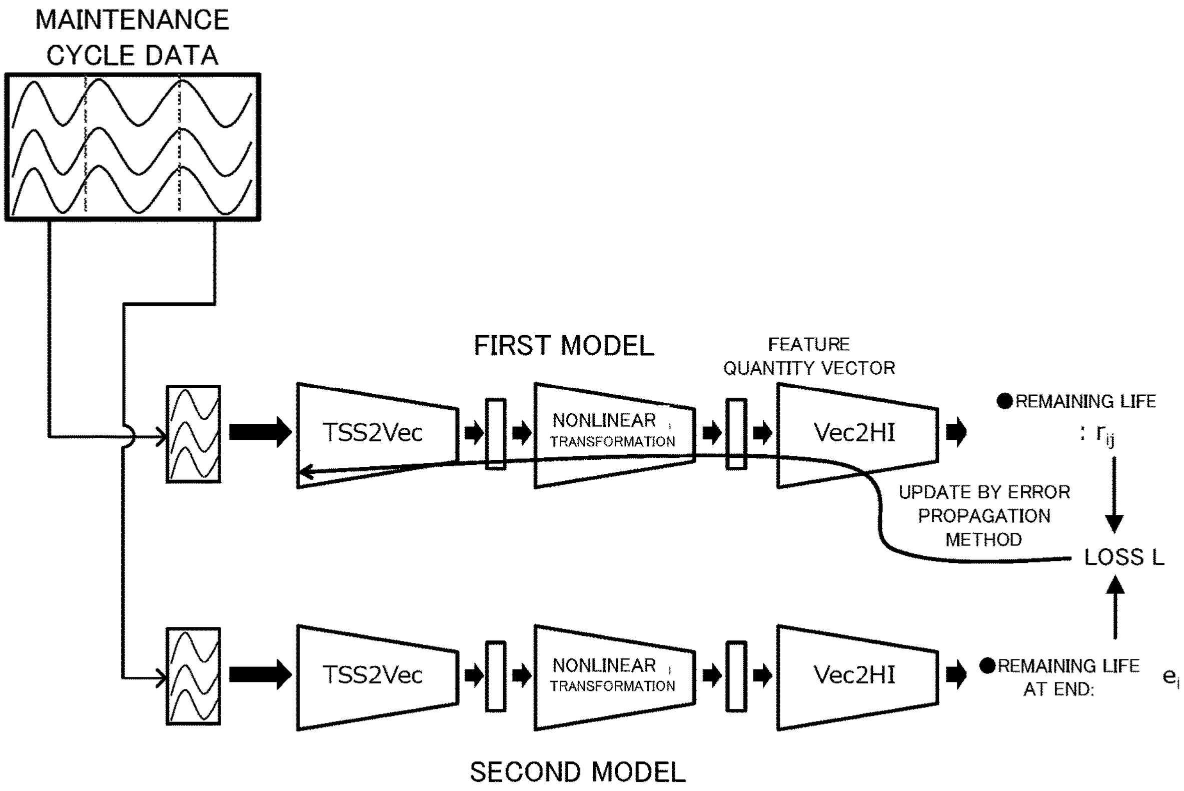
FIG. 6 is a conceptual diagram illustrating a learning method performed by the remaining life prediction system according to the first example embodiment.

Next, with reference to FIGS. 5 and 6, the learning data used in the remaining life prediction system 10 according to the first example embodiment and the model learned by using the learning data will be described in detail. FIG. 5 is a conceptual diagram illustrating a time change in a soundness degree of a device that is a target in each maintenance cycle. FIG. 6 is a conceptual diagram illustrating the learning method performed by the remaining life prediction system according to the first example embodiment.

In FIG. 5, the remaining life prediction system 10 according to the first example embodiment uses a plurality of maintenance cycle data (e.g., see data A to F in the figure) as the learning data. The plurality of maintenance cycle data may be obtained from each separate device, or may be obtained from the same device at different times. The maintenance cycle data may be a value obtained from the target device or a sensor installed in the vicinity of the device for each maintenance cycle, or a statistic value thereof (every certain period, but it is not an entire maintenance cycle), and may be typically multi-dimensional time series data. A soundness degree in the figure is a hypothetical index, and may be a value that cannot be actually observed. The soundness degree here matches the remaining life in a deteriorated area (i.e., an area with a deteriorated soundness degree).

The plurality of maintenance cycle data have varied remaining lives at an end time that is immediately before the maintenance (i.e., a part surrounded by a circle in the figure). Therefore, if the learning is performed for the remaining life at each terminal time by using a value (e.g., which is assumed to be 0) corresponding to a period in which the maintenance is required, there is a possibility that it may be improper learning. The remaining life prediction system 10 according to this example embodiment, however, performs the learning of the model by using the remaining lives at an arbitrary time and a final time of the maintenance cycle data (a relative remaining life based on an arbitrary reference value), as described later.

As illustrated in FIG. 6, the remaining life prediction system 10 according to the first example embodiment includes the first model and the second model, as the model for predicting the remaining life of the target device. Each of the first model and the second model includes a neural network, and may include TSS2Vec (a neural network that is configured to convert the serial data into a vector, such as a regression neural network (RNN, LSTM, GRU, etc.), CNN, and Transformer), nonlinear transformation (a neural network that converts a vector, such as Multilayer Perceptron, into another vector), and Vec2HI (a neural network that converts a vector, such as Multilayer Perceptron, into a scalar value).

The first model uses, as an input, partial time series data at an arbitrary time extracted from the maintenance cycle data (i.e., data excluding an arbitrary partial period, from an entire period included in the maintenance cycle data). Although the arbitrary time here is not particularly limited, it is preferably a part that is relatively close to an end of the maintenance cycle because a deterioration information may not be included at a time that is significantly away from the end. The first model estimates a remaining life $r_{ij}$ at an arbitrary time of the target device ("i" is an index of the maintenance cycle and "j" is a time index in each maintenance cycle) from the inputted partial time series data at the arbitrary time, as a value based on an arbitrary reference value. When the remaining life is predicted, another reference value described later is calculated, and the calculated reference value is used to perform the prediction. Therefore, the "reference value" here may not be defined.

The second model uses, as an input, partial time series data at an end time extracted from the maintenance cycle data (i.e., data excluding a partial period including the end time, from the entire period included in the maintenance cycle data). The second model estimates a remaining life $e_i$ at a final time (i.e., a time immediately before the maintenance) of the target device, from the inputted partial time series data at the end time, as a value based on the reference value that is also used in the first model.

The first model is learned by using the remaining life $r_{ij}$ at the arbitrary time that is the output of the first model and the remaining life $e_i$ at the final time that is the output of the second model. Specifically, the first model is learned to predict the remaining life based on the end of the maintenance cycle data (i.e., the period from immediately before the maintenance to the occurrence of a failure) by using the remaining life $r_{ij}$ at the arbitrary time and the remaining life $e_i$ at the final time. In the first model, for example, a weight parameter may be changed by using an error back propagation method so as to reduce a loss calculated from the remaining life $r_{ij}$ at the arbitrary time and the remaining life $e_i$ at the final time. A loss $L_e$ in this case may be calculated as in the following equation (1), for example.

[Equation 1]

$$L_e = \frac{1}{N}\sum_{(i,j)}\|d_{ij} - (r_{ij} - e_i)\|_2^2 \tag{1}$$

wherein $d_{ij}$ is a value indicating a difference in the actually observed remaining life in the maintenance cycle data (i.e., a difference between the remaining life at the arbitrary time and the remaining life at the final time). The difference in the observed remaining life may be the number of use or an operating time during that period.

(Flow of Learning Method)

Figure 7:
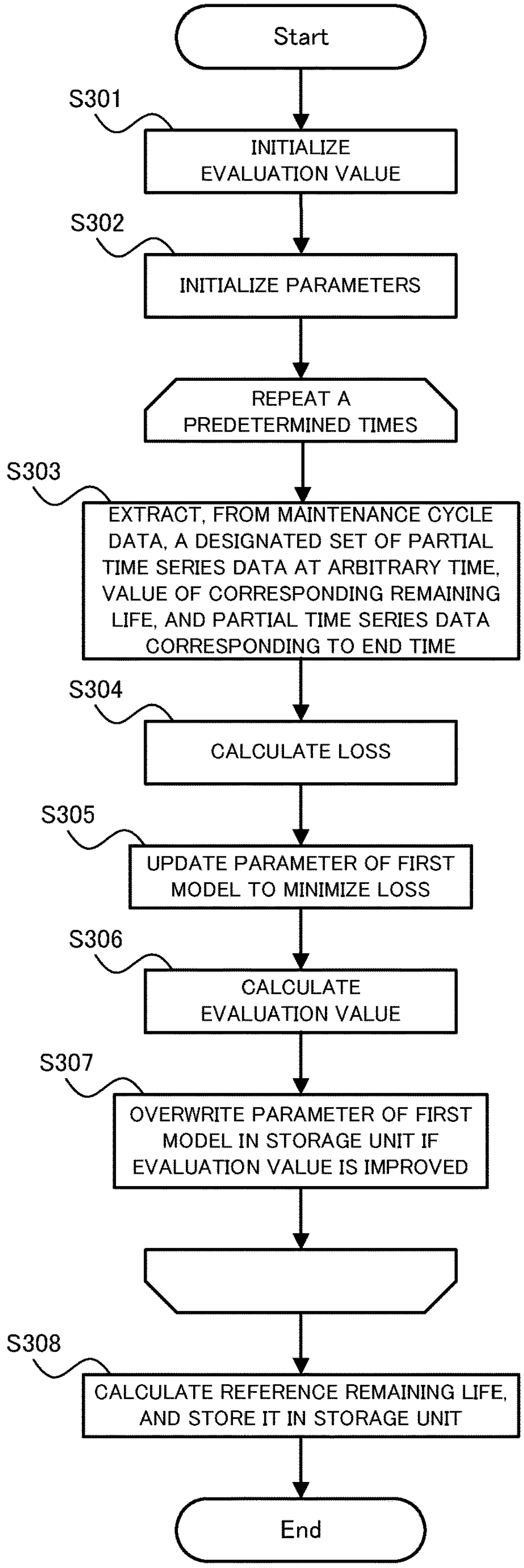
FIG. 7 is a flowchart illustrating a flow of the learning method performed by the remaining life prediction system according to the first example embodiment.

Next, with reference to FIG. 7, a flow of the learning method performed by the remaining life prediction system 10 according to the first example embodiment (specifically, the S102 described in FIG. 3) will be described in detail. FIG. 7 is a flowchart illustrating the flow of the learning method performed by the remaining life prediction system according to the first example embodiment.

As illustrated in FIG. 7, in the learning method performed by the remaining life prediction system 10 according to the first example embodiment, first, the learning unit 130 initializes an evaluation value (described in detail later) (step S301). Furthermore, the learning unit 130 initializes weight parameters of the first model and the second model (step S302). Here, the weight parameters may be initialized such that the first model and the second model have the same parameter.

Subsequently, the learning unit 130 extracts, from the maintenance cycle data included in the learning data, a designation set of the partial time series data at an arbitrary time, the value of the corresponding remaining life (the value of the remaining life when the remaining life of an end of the maintenance cycle data is set to 0), and the partial time series data corresponding to the end time of the maintenance cycle data (step S303). That is, the learning unit 130 extracts data used for the learning from maintenance cycle data, as appropriate.

Subsequently, the learning unit 130 calculates a loss L by using the output of the first model and the second model based on the learning data (step S304). Then, the learning unit 130 updates the weight parameter of the first model to minimize the loss L (step S305). Then, the learning unit 130 calculates the evaluation value by using the loss L (step S306). The "evaluation value" here is an index for determining whether to store the weight parameter of the first model as a best value, and it may be a function including the loss L, or the loss L itself, for example.

Subsequently, if the evaluation value is improved, the learning unit 130 overwrites the weight parameter of the first model in the storage unit 150 (step S307). The steps S303 to S307 are repeated by a preset number of iterations.

When the learning is ended, the learning unit 130 reads the weight parameter of the first model stored in the storage unit 150 and calculates a reference remaining life (step S308). The "reference remaining life" here is a minimum value of the remaining life $e_i$ at the final time of each maintenance cycle, or a minimum value of an estimated value (e.g., $e_i$ (hat)) of the remaining life at the final time based on a plurality of samples of different cycles. The estimated value of the remaining life at the final time may be calculated by using the following equation (2), for example.

[Equation 2]

$$\hat{e}_i = \frac{1}{N_j}\sum_j r_{ij} - \frac{1}{N_j}\sum_j d_{ij} \tag{2}$$

As another aspect, the estimated value of the remaining life at the final time may be a value obtained by inputting, to the second model, the data that are inputted to the first model used for the calculation of $r_{ij}$, and by using the output as $r_{ij}$ to calculate the equation (2).

(Technical Effect)

Next, a technical effect obtained by the remaining life prediction system 10 according to the first example embodiment will be described.

As described in FIG. 1 to FIG. 7, in the remaining life prediction system 10 according to the first example embodiment, the learning is performed to predict the remaining life based on the end of the maintenance cycle data, by using the remaining life $r_{ij}$ at the arbitrary time and the remaining life $e_i$ at the final time. In this way, it is possible to perform proper learning even when the end of each maintenance cycle data obtained varies. As a result, it is possible to predict the remaining life of the target device with high accuracy, and it is possible to perform the maintenance at proper timing, for example.

Second Example Embodiment

The remaining life prediction system 10 according to a second example embodiment will be described with reference to FIG. 8 and FIG. 9. The second example embodiment is partially different from the first example embodiment only in the configuration and operation, and may be the same as the first example embodiment in the other parts. For this reason, a part that is different from the first example embodiment will be described in detail below, and a description of other overlapping parts will be omitted as appropriate.

(Learning of Second Model)

First, with reference to FIG. 8, a learning method performed by the remaining life prediction system 10 according to the second example embodiment will be described in detail. FIG. 8 is a conceptual diagram illustrating the learning method performed by the remaining life prediction system according to the second example embodiment.

Figure 8:
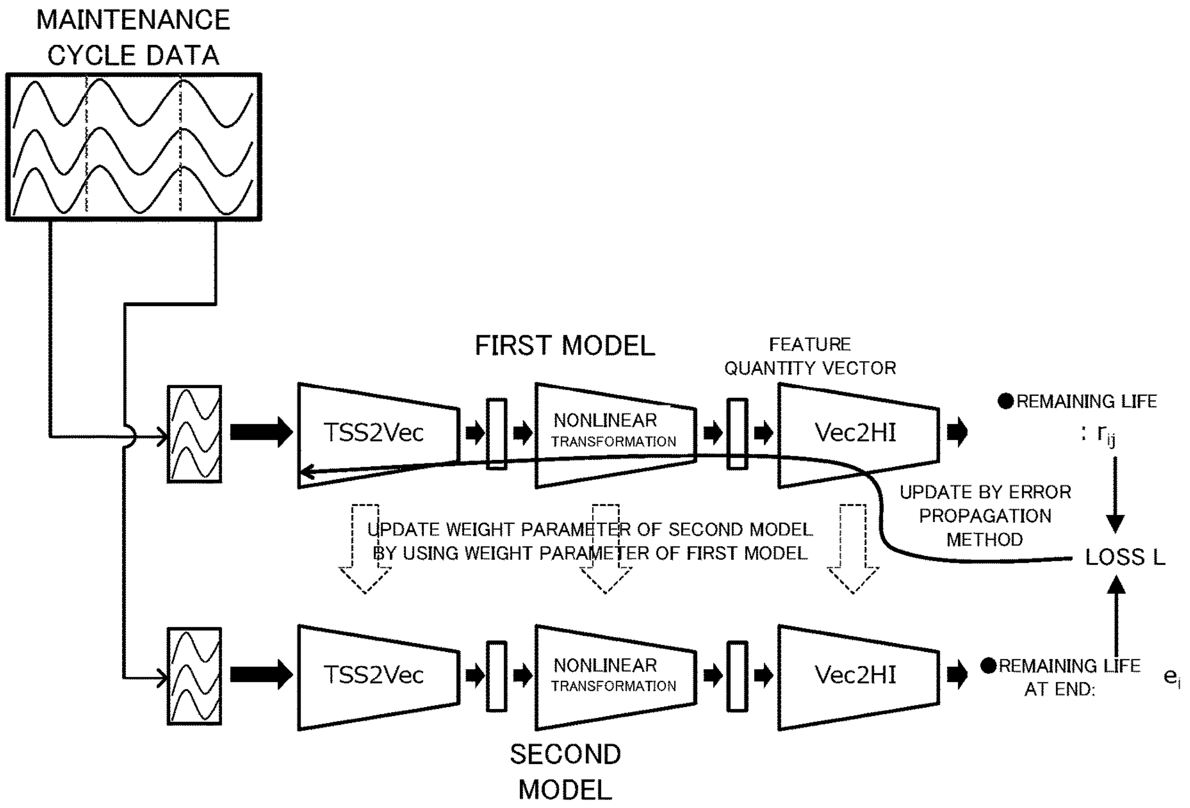
FIG. 8 is a conceptual diagram illustrating a learning method performed by a remaining life prediction system according to a second example embodiment.

As illustrated in FIG. 8, in the remaining life prediction system 10 according to the second example embodiment, the weight parameter of the second model is updated by using the weight parameter of the first model (i.e., the weight parameter updated by the learning). That is, in the remaining life prediction system 10 according to the second example embodiment, in addition to the first model, the second model is also learned. When the weight parameter of the second model is updated, at least a part of it may be updated. That is, the entire weight parameter included in the second model does not need to be updated, and a part of the weight parameter may be updated.

(Flow of Learning Method)

Next, a flow of the learning method performed by the remaining life prediction system 10 according to the second example embodiment will be described with reference to FIG. 9. FIG. 9 is a flowchart illustrating a flow of the learning method performed by the remaining life prediction system according to the second example embodiment. In FIG. 9, the same steps as those illustrated in FIG. 7 carry the same reference numerals.

Figure 9:
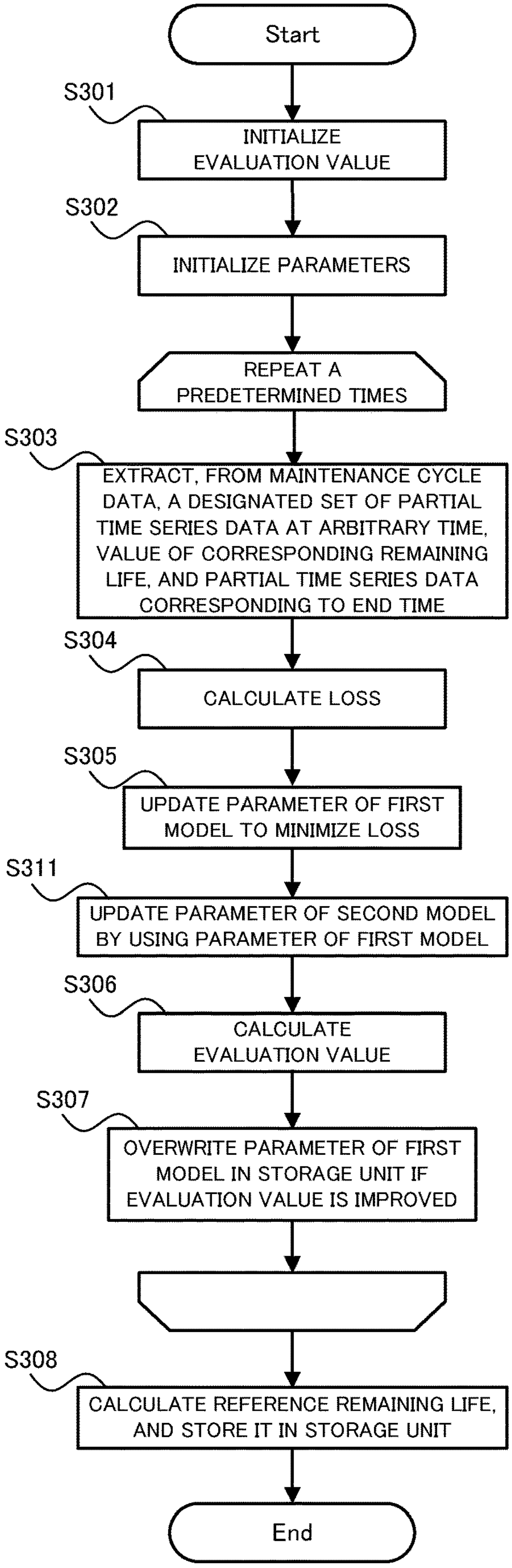
FIG. 9 is a flowchart illustrating a flow of the learning method performed by the remaining life prediction system according to the second example embodiment.

As illustrated in FIG. 9, in the learning by the remaining life prediction system 10 according to the second example embodiment, the process (see FIG. 7) is executed in substantially the same flow as that of the first example embodiment. In the remaining life system 10 according to the second example embodiment, however, after the process of updating the weight parameter of the first model (step S305), a process of updating the weight parameter of the second model is performed by using the updated weight parameter of the first model (step S311). Then, the steps S303 to S307 including the step S311 are repeated a predetermined number of times.

The weight parameter of the second model may be updated by using an exponential moving average of the weight parameter of the first model, for example. For example, if the weight parameter of the first model is $W_{1i}$ and the weight parameter of the second model is $W_{2i}$, in the step S311, the weight parameter of the second model may be updated such that $W_{2i}=(1-a)W_{1i}+aW_{2i}$. In this case, the weight parameter $W_{2i}$ in the past of the second model is reduced by a factor of a (which is smaller than 1), and this process is repeated to realize the updating using the exponential moving average.

Technical Effect

Next, a technical effect obtained by the remaining life prediction system 10 according to the second example embodiment will be described.

As described in FIG. 8 and FIG. 9, in the remaining life prediction system 10 according to the second example embodiment, the weight parameter of the second model is updated by using the weight parameter of the first model. In this way, since not only the first model but also the second model is learned, it is possible to perform the learning more properly than that when only the weight parameter of the first model is updated. In addition, by using the exponential moving average of the weight parameter of the first model, it is possible to update the weight parameter of the second model while properly considering the weight parameter of the first model.

Third Example Embodiment

The remaining life prediction system 10 according to a third example embodiment will be described with reference to FIG. 10. The third example embodiment is partially different from the first and second example embodiments only in the configuration and operation, and may be the same as the first and second example embodiments in the other parts. For this reason, a part that is different from each of the example embodiments described above will be described in detail below, and a description of other overlapping parts will be omitted as appropriate.

(Calculation of Loss)

First, with reference to FIG. 10, a method of calculating the loss by the remaining life prediction system 10 according to the third example embodiment will be described. FIG. 10 is a flowchart illustrating a flow of the method of calculating the loss function by the remaining life prediction system according to the third example embodiment.

In the remaining life prediction system 10 according to the third example embodiment, the model for predicting the remaining life is learned in the assumption that similar input data have similar values of the remaining life. Specifically, the loss L used in learning the model for predicting the remaining life, is calculated as what a regularization term of Feature matching is added. Specifically, the loss L may be calculated by the following equation (3).

[Equation 3]

$$L=L_e+\lambda L_f \tag{3}$$

wherein "$L_e$" in the equation (3) is the value described in the equation (1), and "λLf" is the regularization term of Feature matching. λ is a hyperparameter, and $L_f$ can be calculated by using the following equation (4), for example.

[Equation 4]

$$L_f = \|\mathbb{E}[f_1] - \mathbb{E}[f_1']\|_2^2 + \|\mathbb{E}[f_2] - \mathbb{E}[f_2']\|_2^2 \tag{4}$$

Figure 10:
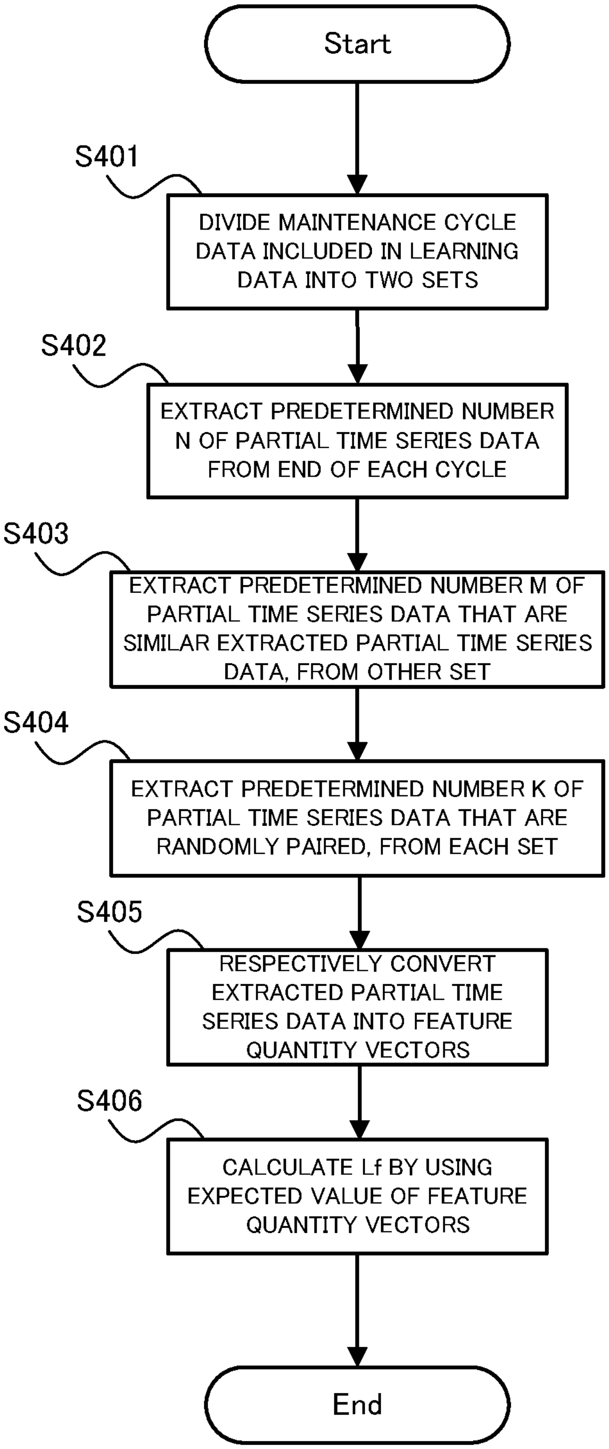
FIG. 10 is a flowchart illustrating a flow of a method of calculating a loss function by a remaining life prediction system according to a third example embodiment.

As illustrated in FIG. 10, when the above Lf is calculated, first, a plurality of maintenance cycle data included in the learning data are divided into two sets (step S401). That is, the plurality of maintenance cycle data are divided into data included in a first data group and data included in a second data group.

Subsequently, a predetermined number N of partial time series data is extracted from the end of each cycle (step S402). Then, a predetermined number M of partial time series data that are similar to the extracted partial time series data, are extracted from the other set (step S403). The N partial time series data and the M partial time series data extracted here are pair candidates for each other.

Subsequently, in the learning of the model, a predetermined number K of partial time series data that are randomly paired, are extracted from each set (step S404). Then, the extracted K partial time series data are respectively converted into feature quantity vectors (step S405). Here, the converted feature quantity vectors are fk and fk' in the above equation.

Finally, $L_f$ is calculated by using an expected value E of the converted feature quantity vectors fk and fk' (step S406).

The regularization term of Feature matching may be obtained by calculating Maximum Mean Discrepancy of fk and fk' by using a kernel. In this case, a Radial basis function kernel may be used for the kernel, for example.

(Technical Effect)

Next, a technical effect obtained by the remaining life prediction system 10 according to the third example embodiment will be described.

As described in FIG. 10, in the remaining life estimation system 10 according to the third example embodiment, the regularization term of Feature matching is considered in calculating the loss L. In this way, since the model can be learned more properly, it is possible to predict the remaining life of the target device with higher accuracy.

Fourth Example Embodiment

The remaining life prediction system 10 according to a fourth example embodiment will be described with reference to FIG. 11. The fourth example embodiment is partially different from the first to third example embodiments only in the configuration and operation, and may be the same as the first to third embodiments in the other parts. For this reason, a part that is different from each of the example embodiments described above will be described in detail below, and a description of other overlapping parts will be omitted as appropriate.

(Setting of Initial Value by Pre-Learning)

First, a flow of a learning operation by the remaining life prediction system 10 according to the fourth example embodiment (specifically, a learning operation using pre-learning or prior learning) will be described with reference to FIG. 11. FIG. 11 is a flowchart illustrating the flow of the learning operation of the remaining life prediction system according to the fourth example embodiment. In FIG. 11, the same steps as those illustrated in FIG. 3 carry the same reference numerals.

Figure 11:
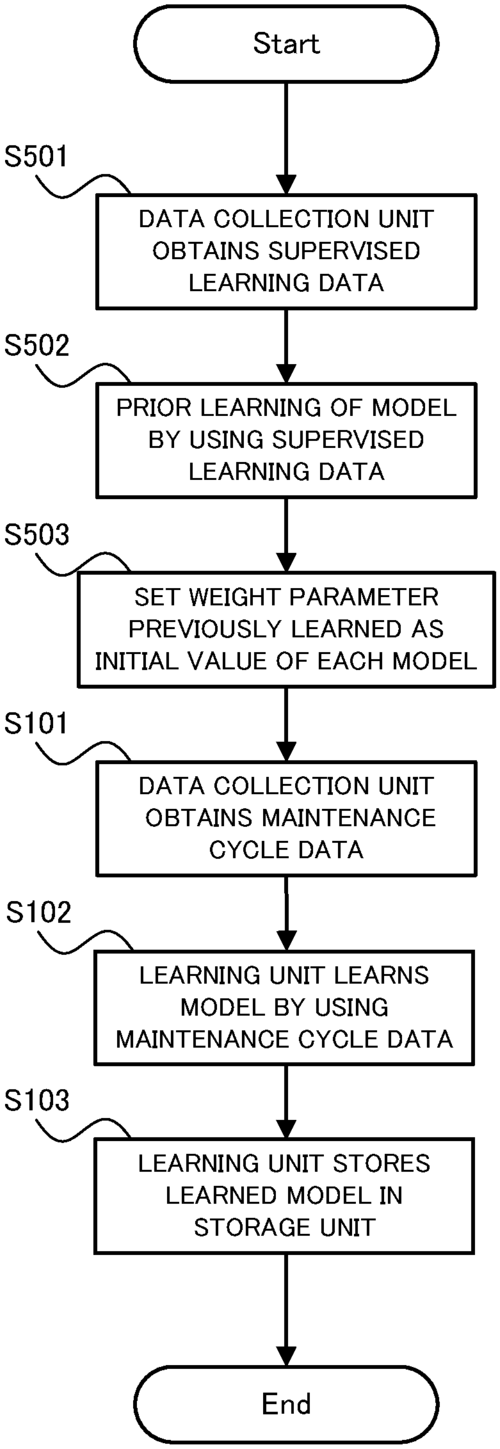
FIG. 11 is a flowchart illustrating a flow of a learning operation of a remaining life prediction system according to a fourth example embodiment.

As illustrated in FIG. 11, in the learning operation performed by the remaining life estimating system 10 according to the fourth example embodiment, first, the data collection unit 110 obtains supervised learning data (step S501). The supervised learning data obtained here are time series operation data from a healthy state to a failure of the target device (run-to-failure-data). A label for the learning is provided as the number of use before the failure and an operation time, for example.

Subsequently, the learning unit 130 performs pre-learning of the first model and the second model by using the supervised learning data (step S502). This is realized by performing the pre-learning of the first model and initializing the second model with the weight parameter of the first model pre-learned. Then, the pre-learned weight parameter is set as an initial value of the weight parameter of each model (step S503).

Then, the same process as in the first example embodiment (see FIG. 3) is performed. That is, the model is learned by using the maintenance cycle data (i.e., unsupervised learning data). In the fourth example embodiment, however, as described above, the learning is started in a condition in which the initial value of the weight parameter of each model is set by the pre-learning. Therefore, the initialization of the weight parameter as described in the step S302 in FIG. 7 may not be performed.

In the pre-learning, the first model is learned by using the remaining life $r_{ij}$ at the arbitrary time, which is the output of the first model, and a provided label $r_{ij}'$. Specifically, the first model is learned such that $r_{ij}$ matches $r_{ij}'$. In the first model, the weight parameter may be change by using an error back propagation method, for example. A loss $L_{es}$ in this case may be calculated as in the following equation (5), for example.

[Equation 5]

$$L_{es} = \frac{1}{N}\sum_{(i,j)}\left\|r_{ij}' - r_{ij}\right\|_2^2 \tag{5}$$

(Technical Effect)

Next, a technical effect obtained by the remaining life prediction system 10 according to the fourth example embodiment will be described.

As described in FIG. 11, in the remaining life prediction system 10 according to the fourth example embodiment, the initial value of the weight parameter of each of the first model and the second model is set by the pre-learning using the supervised learning data. In this way, since the initial value of each model is set to have a proper value, subsequent learning using the unsupervised learning data can be efficiently performed. In this example embodiment, it is assumed that the number of the supervised learning data is less than the number of the unsupervised learning data (specifically, it is assumed that the number of data is insufficient for the learning using only the supervised learning data, and it is necessary to use the unsupervised learning data).

Fifth Example Embodiment

The remaining life prediction system 10 according to a fifth example embodiment will be described with reference to FIG. 12. The fifth example embodiment is partially different from the first to fourth example embodiments only in the configuration and operation, and may be the same as the first to fourth embodiments in the other parts. For this reason, a part that is different from each of the example embodiments described above will be described in detail below, and a description of other overlapping parts will be omitted as appropriate. In this example embodiment, the learning data includes two data that are supervised data and unsupervised data (the maintenance cycle data).

(Learning Using Training Data)

First, a learning operation by the remaining life prediction system 10 according to the fifth example embodiment (a learning operation corresponding to the presence or absence of training data) will be described with reference to FIG. 12. FIG. 12 is a flowchart illustrating a flow of the learning operation of the remaining life prediction system according to the fifth example embodiment. Steps illustrated in FIG. 12 respectively correspond to the steps S303 to S307 in FIG. 7, and as described in FIG. 7, the steps are repeated a predetermined number of times.

Figure 12:
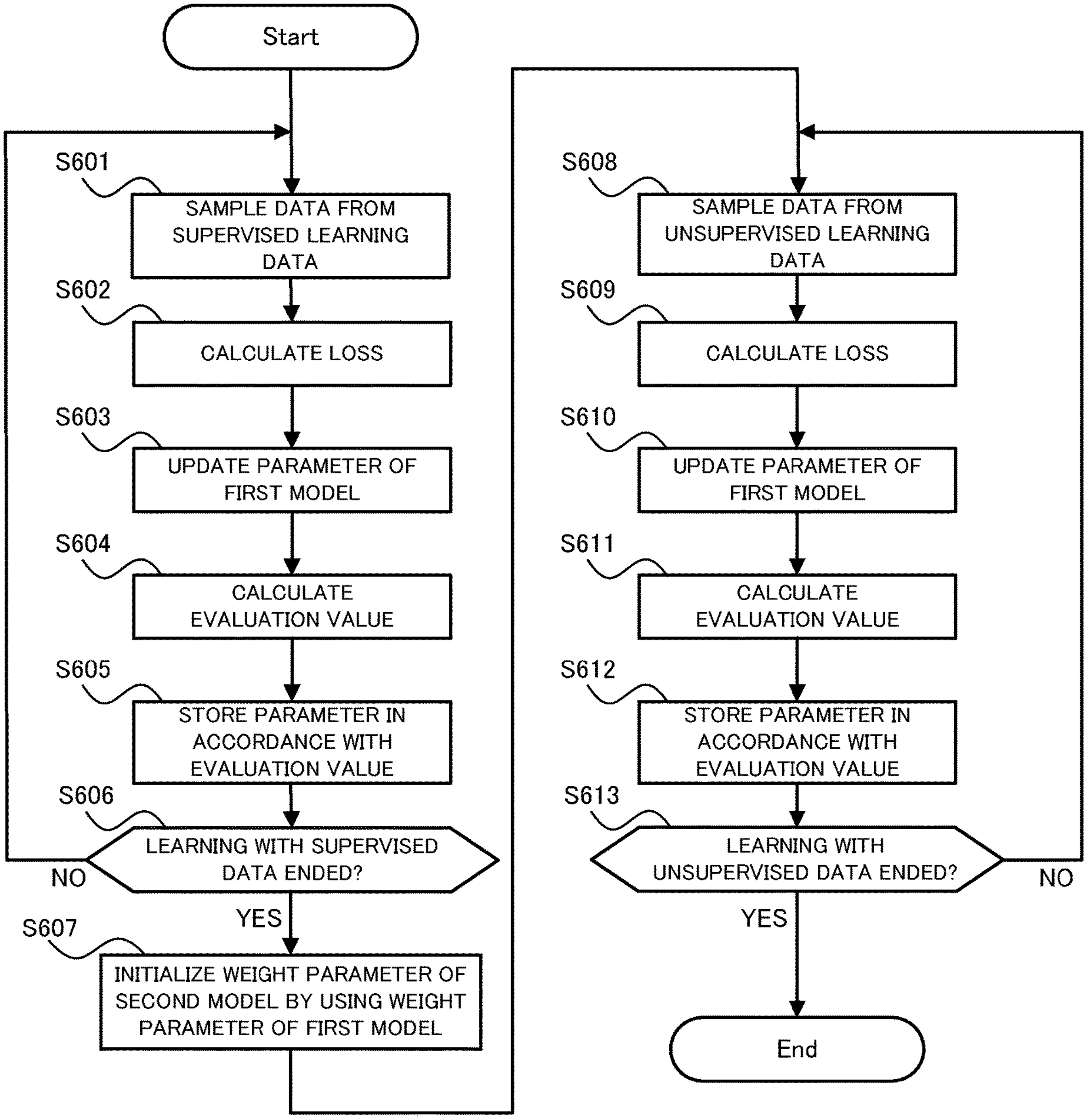
FIG. 12 is a flowchart illustrating a flow of the learning operation of the remaining life prediction system according to the fifth example embodiment.

As illustrated in FIG. 12, in the learning operation performed by the remaining life estimating system 10 according to the fifth example embodiment, first, the learning unit 130 performs the learning by using the supervised learning data (i.e., the time series operation data from the healthy state to the failure of the target device). Specifically, first, the learning unit 130 samples data from the supervised learning data (step S601). Then, the learning unit 130 calculates the loss by using an output of the first model based on the supervised learning data (step S602). In the learning using the supervised learning data, the loss may be calculated by using the equation (5), as described in the fourth example embodiment.

Subsequently, the learning unit 130 updates the weight parameter of the first model to minimize the loss (step S603). Then, the learning unit 130 calculates the evaluation value by using the loss (step S604). Then, if the evaluation value is improved, the learning unit 130 overwrites the weight parameter of the first model in the storage unit 150 (step S605).

When the steps S601 to S605 are repeated a predetermined number of times and the learning using the supervised learning data is ended (step S606: YES), the learning unit 130 initializes the weight parameter of the second model by using the weight parameter of the first model (step S607), and performs the learning by using the unsupervised learning data (i.e., the maintenance cycle data). Specifically, the learning unit 130 samples data from the unsupervised learning data (step S608). Then, the learning unit 130 calculates the loss by using outputs of the first model and the second model based on the unsupervised learning data (step S609). In the learning using the unsupervised learning data, as described in the first example embodiment, the loss may be calculated by using the equation (1).

Subsequently, the learning unit 130 updates the weight parameters of the first and second models to minimize the loss (step S610). Then, the learning unit 130 calculates the evaluation value by using the loss (step S611). Then, if the evaluation value is improved, the learning unit 130 overwrites the weight parameters of the first and second models in the storage unit 150 (step S612). When the steps S608 to S612 are repeated a predetermined number of times, it is determined that the learning using the unsupervised learning data is also ended (step S613: YES).

Although a description is given to the example in which the learning is performed by the unsupervised learning data immediately after the learning is performed by the supervised learning data, these learning may be performed at the same time. That is, the learning may be performed at the same time by using both the supervised learning data and the unsupervised learning data. When the learning is performed at the same time, after the sampling of data is performed on each learning data, the loss corresponding to each type of data is calculated, and the parameters may be updated by using a sum of the calculated losses. Then, the process may be performed in the order of the calculation of the evaluation value and the storage of the best parameter.

(Technical Effect)

Next, a technical effect obtained by the remaining life prediction system 10 according to the fifth example embodiment will be described.

As described in FIG. 12, in the remaining life prediction system 10 according to the fifth example embodiment, when the weight parameters of the first and second models are learned, the final weight parameters are determined by using both the supervised data and the unsupervised data. In this way, the model for predicting the remaining life based on failure occurrence is learned, even when information about unsupervised data is used and there are few supervised data. As a result, it is possible to make a more proper maintenance plan.

The fourth example embodiment (see FIG. 11) and the fifth example embodiment (see FIG. 12) may be combined and realized. Specifically, first, as described in the fourth example embodiment, the initial value is set by the pre-learning, and then, as described in the fifth example embodiment, the learning by the supervised learning data and the unsupervised data may be performed. In this way, it is possible to utilize the supervised learning data in both the pre-learning and the subsequent learning, thereby to perform the learning more properly.

Sixth Example Embodiment

The remaining life prediction system 10 according to a sixth example embodiment will be described with reference to FIG. 13. The sixth example embodiment is partially different from the first to fifth example embodiments only in the operation, and may be the same as the first to fifth example embodiments in the other parts. For this reason, a part that is different from each of the example embodiments described above will be described in detail below, and a description of other overlapping parts will be omitted as appropriate.

(Learning of Different Model)

First, a learning operation by the remaining life prediction system 10 according to the sixth example embodiment (specifically, a learning operation of another model using the learned model) will be described with reference to FIG. 13. FIG. 13 is a flowchart illustrating a flow of the learning operation performed by the remaining life prediction system according to the sixth example embodiment.

Figure 13:
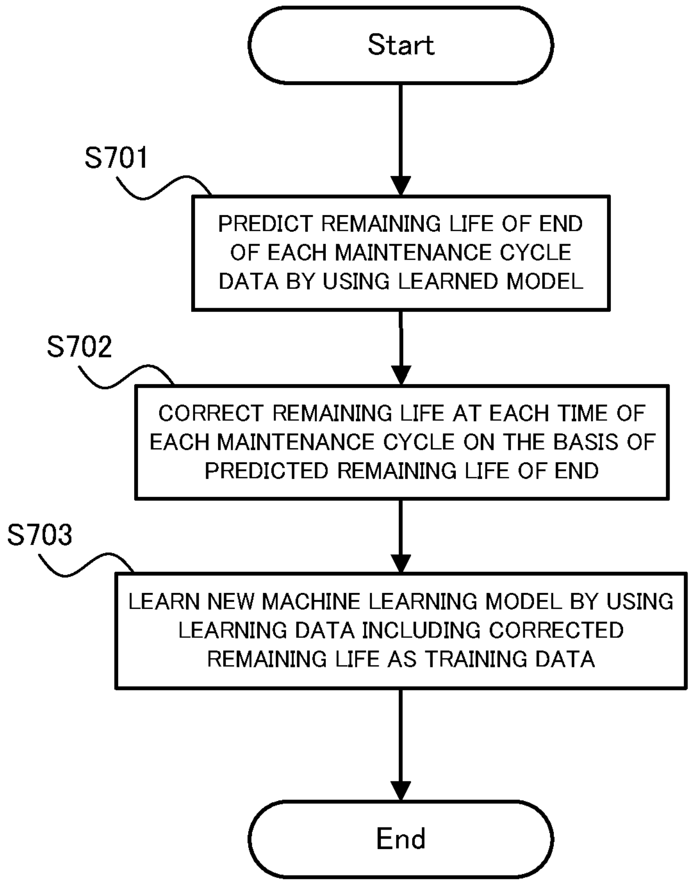
FIG. 13 is a flowchart illustrating a flow of a learning operation of a remaining life prediction system according to a sixth example embodiment.

As illustrated in FIG. 13, in the remaining life prediction system 10 according to the sixth example embodiment, the prediction unit 130 predicts the remaining life of the end of each maintenance cycle data by using the model learned by using the methods described in the example embodiments described above (step S701).

Subsequently, the prediction unit 130 corrects the remaining life at each time of each maintenance cycle data on the basis of the predicted remaining life of the end (step S702). The remaining life corrected here is treated as training data for each maintenance cycle data.

Subsequently, the learning unit 130 learns a new machine learning model, by using the maintenance cycle data in which the remaining life is corrected, as the supervised learning data (step S703). In the learning here, the weight parameters may be updated such that the predicted value of the model and the training data approach each other. The machine learning model learned here may be a model that does not include a neural network.

The machine learning model learned as described above may be used in another system (e.g., a similar system that is installed in another location). That is, the learned model used in the step S701 and the machine learning model learned in the step S703 may be respectively used in different remaining life prediction systems.

(Technical Effect)

Next, a technical effect obtained by the remaining life prediction system 10 according to the sixth example embodiment will be described.

As described in FIG. 13, in the remaining life prediction system 10 according to the sixth example embodiment, a new machine learning model for predicting the remaining life is learned, after correcting the remaining life of the end of each maintenance cycle by using the learned model for predicting the remaining life of the end of each maintenance cycle that is learned by the methods in the example embodiments described above. In this way, it is possible to separately configure the learning for correcting a difference in the remaining life of the end of each maintenance cycle, and the learning for predicting the remaining life in the entire maintenance cycle data. As a result, even when there is a period in which the operation data that are a base of the prediction do not have information for predicting the remaining life, it is possible to predict the model for predicting the remaining life in a wider range, by selecting data used for the learning, by learning the model, and by evaluating it on the basis of the corrected remaining life.

A processing method in which a program for allowing the configuration in each of the example embodiments to operate to realize the functions of each example embodiment is recorded on a recording medium, and the program recorded on the recording medium is read as a code and executed on a computer, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and executes processing alone, but also the program that operates on an OS and executes processing in cooperation with the functions of expansion boards and another software, is also included in the scope of each of the example embodiments. In addition, the program itself may be stored in a server, and a part or all of the program may be downloaded from the server to a user terminal.

<Supplementary Notes>

The example embodiments described above may be further described as, but not limited to, the following Supplementary Notes below.

(Supplementary Note 1)

A method of learning a neural network described in Supplementary Note 1 is a method of learning a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method includes updating a weight parameter of the first model so as to predict a remaining life based on an end of the maintenance cycle data, by using an output of the first model and an output of the second model that are obtained from learning data including a plurality of maintenance cycle data.

(Supplementary Note 2)

A method of learning the neural network described in Supplementary Note 2 is the method of learning the neural network described in Supplementary Note 1, wherein the updated weight parameter of the first model is used to update at least a part of a weight parameter of the second model.

(Supplementary Note 3)

A method of learning the neural network described in Supplementary Note 3 is the method of learning the neural network described in Supplementary Note 2, wherein an exponential moving average of the updated weight parameter of the first model is used to update at least a part of the weight parameter of the second model.

(Supplementary Note 4)

A method of learning the neural network described in Supplementary Note 4 is the method of learning the neural network described in any one of Supplementary Notes 1 to 3, including: dividing the learning data into a first data group and a second data group; extracting first partial data included in the first data group, and second partial data, which are similar to the first partial data, included in the second data group; and updating the weight parameter of the first model such that feature quantity vectors of the first partial data are similar to the feature quantity vectors of the second partial data.

(Supplementary Note 5)

A method of learning the neural network described in Supplementary Note 5 is the method of learning the neural network described in any one of Supplementary Notes 1 to 4, wherein the learning data include: a plurality of supervised learning data that are time series operation data from a healthy state to a failure of the target device; and a plurality of unsupervised learning data that are the maintenance cycle data, and the method includes: pre-learning the neural network by using the supervised learning data; and setting the pre-learned weight parameter of the neural network as initial values of the first model and the second model, and then updating the weight parameter of the first model so as to predict the remaining life based on the end of the maintenance cycle data, by using an output of the first model and an output of the second model that are obtained from the unsupervised learning data.

(Supplementary Note 6)

A method of learning the neural network described in Supplementary Note 6 is the method of learning the neural network described in any one of Supplementary Notes 1 to 5, wherein the learning data include: a plurality of supervised learning data that are time series operation data from a healthy state to a failure of the target device; and a plurality of unsupervised learning data that are the maintenance cycle data, and the method includes updating the weight parameter of the first model such that a predicted value predicted by the first model and a measured value of the remaining life indicated by the supervised learning data approach each other, when the supervised learning data are used.

(Supplementary Note 7)

A method of learning the neural network described in Supplementary Note 7 is the method of learning the neural network described in any one of Supplementary Notes 1 to 6, wherein the learning data include: a plurality of supervised learning data that are time series operation data from a healthy state to a failure of the target device; and a plurality of unsupervised learning data that are the maintenance cycle data, and the method includes: pre-learning the neural network by using the supervised learning data; setting the pre-learned weight parameter of the neural network as initial values of the first model and the second model, and then updating the weight parameter of the first model so as to predict the remaining life based on the end of the maintenance cycle data, by using an output of the first model and an output of the second model that are obtained from the learning data; and updating the weight parameter of the first model such that a predicted value predicted by the first model and a measured value of the remaining life indicated by the supervised learning data approach each other, when the supervised learning data are used.

(Supplementary Note 8)

A method of learning the neural network described in Supplementary Note 8 is the method of learning the neural network described in any one of Supplementary Notes 1 to 7, including: predicting the remaining life of the end of each maintenance cycle data by using the first model or the second model in which the weight parameter is updated; correcting the remaining life at each time of the each maintenance cycle data, on the basis of the predicted remaining life of the end of each maintenance cycle data; and learning a new machine learning model for predicting the remaining life of the target device, by using learning data including the corrected remaining life as training data.

(Supplementary Note 9)

A computer program described in Supplementary Note 9 is a computer program that allows a computer to execute a method of learning a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method includes updating a weight parameter of the first model so as to predict a remaining life based on an end of the maintenance cycle data, by using an output of the first model and an output of the second model that are obtained from learning data including a plurality of maintenance cycle data.

(Supplementary Note 10)

A recording medium described in Supplementary Note 10 is a non-transitory recording medium on which a computer program that allows a computer to execute a method of learning a neural network that predicts a remaining life of a target device that is a maintenance target is recorded, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method includes updating a weight parameter of the first model so as to predict a remaining life based on an end of the maintenance cycle data, by using an output of the first model and an output of the second model that are obtained from learning data including a plurality of maintenance cycle data.

(Supplementary Note 11)

A remaining life prediction system described in Supplementary Note 11 is a remaining life prediction system including a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the first model is updated by updating a weight parameter of the first model so as to predict a remaining life based on an end of the maintenance cycle data, by using an output of the first model and an output of the second model that are obtained from learning data including a plurality of maintenance cycle data.

(Supplementary Note 12)

A remaining life prediction apparatus described in Supplementary Note 12 is a remaining life prediction apparatus including a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the first model is updated by updating a weight parameter of the first model so as to predict a remaining life based on an end of the maintenance cycle data, by using an output of the first model and an output of the second model that are obtained from learning data including a plurality of maintenance cycle data.

This disclosure is not limited to the above-described examples and is allowed to be changed, if desired, without departing from the essence or spirit of the invention which can be read from the claims and the entire specification. A learning method of a neural network, a computer program, and a remaining life prediction system with such changes, are also included in the technical concepts of this disclosure.

DESCRIPTION OF REFERENCE NUMERALS

10 Remaining life prediction system
11 Processor
14 Storage apparatus
110 Data collection unit
120 Learning unit
130 Prediction unit
140 Output unit
150 Storage unit
$r_{ij}$ Remaining life at an arbitrary time
$e_i$ Remaining life at a final time

What is claimed is:

1. A computer-implemented method of learning a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method comprises updating a weight parameter of the first model so as to predict a remaining life based on an end of the maintenance cycle data, by using an output of the first model and an output of the second model that are obtained from learning data including a plurality of maintenance cycle data.

2. The method of learning the neural network according to claim 1, wherein the updated weight parameter of the first model is used to update at least a part of a weight parameter of the second model.

3. The method of learning the neural network according to claim 2, wherein an exponential moving average of the updated weight parameter of the first model is used to update at least a part of the weight parameter of the second model.

4. The method of learning the neural network according to claim 1, comprising:

dividing the learning data into a first data group and a second data group; extracting first partial data included in the first data group, and second partial data, which are similar to the first partial data, included in the second data group; and updating the weight parameter of the first model such that feature quantity vectors of the first partial data are similar to the feature quantity vectors of the second partial data.

5. The method of learning the neural network according to claim 1, wherein the learning data include: a plurality of supervised learning data that are time series operation data from a healthy state to a failure of the target device; and a plurality of unsupervised learning data that are the maintenance cycle data, and the method comprises:

pre-learning the neural network by using the supervised learning data; and setting the pre-learned weight parameter of the neural network as initial values of the first model and the second model, and then updating the weight parameter of the first model so as to predict the remaining life based on the end of the maintenance cycle data, by using an output of the first model and an output of the second model that are obtained from the unsupervised learning data.

6. The method of learning the neural network according to claim 1, wherein the learning data include:

a plurality of supervised learning data that are time series operation data from a healthy state to a failure of the target device; and a plurality of unsupervised learning data that are the maintenance cycle data, and the method comprises updating the weight parameter of the first model such that a predicted value predicted by the first model and a measured value of the remaining life indicated by the supervised learning data approach each other, when the supervised learning data are used.

7. The method of learning the neural network according to claim 1, wherein the learning data include: a plurality of supervised learning data that are time series operation data from a healthy state to a failure of the target device; and a plurality of unsupervised learning data that are the maintenance cycle data, and the method comprises: pre-learning the neural network by using the supervised learning data; setting the pre-learned weight parameter of the neural network as initial values of the first model and the second model, and then updating the weight parameter of the first model so as to predict the remaining life based on the end of the maintenance cycle data, by using an output of the first model and an output of the second model that are obtained from the learning data; and updating the weight parameter of the first model such that a predicted value predicted by the first model and a measured value of the remaining life indicated by the supervised learning data approach each other, when the supervised learning data are used.

8. The method of learning the neural network according to claim 1, comprising:

predicting the remaining life of the end of each maintenance cycle data by using the first model or the second model in which the weight parameter is updated;

correcting the remaining life at each time of the each maintenance cycle data, on the basis of the predicted remaining life of the end of each maintenance cycle data; and learning a new machine learning model for predicting the remaining life of the target device, by using learning data including the corrected remaining life as training data.

9. A non-transitory recording medium on which a computer program that allows a computer to execute a method of learning a neural network that predicts a remaining life of a target device that is a maintenance target is recorded, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the method comprises updating a weight parameter of the first model so as to predict a remaining life based on an end of the maintenance cycle data, by using an output of the first model and an output of the second model that are obtained from learning data including a plurality of maintenance cycle data.

10. A remaining life prediction system comprising a neural network that predicts a remaining life of a target device that is a maintenance target, wherein the neural network includes: (i) a first model for predicting a remaining life at an arbitrary time of maintenance cycle data that are time series operation data of the time series from immediately after maintenance of the target device to immediately before a next maintenance, as a value based on an arbitrary reference value; and (ii) a second model for predicting a remaining life at a final time of the maintenance cycle data, as a value based on the reference value, and the first model is updated by updating a weight parameter of the first model so as to predict a remaining life based on an end of the maintenance cycle data, by using an output of the first model and an output of the second model that are obtained from learning data including a plurality of maintenance cycle data.

* * * * *